Sept. 11, 1962     R. L. SHAW     3,053,583
AIR BEARING

Filed March 10, 1960     2 Sheets-Sheet 1

*INVENTOR.*
RICHARD L. SHAW
BY
Allen A. Dicke Jr.
AGENT

Sept. 11, 1962 R. L. SHAW 3,053,583
AIR BEARING
Filed March 10, 1960 2 Sheets-Sheet 2

INVENTOR.
RICHARD L. SHAW
BY
AGENT

United States Patent Office 3,053,583
Patented Sept. 11, 1962

3,053,583
AIR BEARING
Richard L. Shaw, Sidney, Ohio, assignor to The Monarch Machine Tool Company, Sidney, Ohio, a corporation of Ohio
Filed Mar. 10, 1960, Ser. No. 14,109
7 Claims. (Cl. 308—9)

This invention relates to reciprocable machine tool members and their guidance and bearing upon the machine tool. In the past, machine tool elements were guided on combinations of V's and flats and held in place by gravity. These surfaces provide accurate guidance and are adapted for rigid mounting, but admit of a great deal of friction when it is necessary to move the machine tool member. The present invention contemplates the use of gaseous fluid bearings, preferably air bearings, for replacing the metal to metal bearings lubricated with a thin film of highly viscous oil. The use of a low viscosity fluid such as air substantially reduces the frictional drag yet provides equally accurate guidance. The specific air pads of this invention are designed to allow minimum air volume to eliminate the oscillations encountered due to the compressibility of air in any volume of consequence.

Therefore, it is an object of this invention to provide suitable gaseous fluid bearings for a reciprocable member, It is a further object of this invention to provide low volume air pads for guiding and supporting a reciprocable member to prevent oscillations thereof, It is an object of this invention to provide a proper air bearing for relatively slow speed, heavy reciprocable machine members, It is another object to provide a bearing which conserves liquid lubricants by making them unnecessary, It is another object to provide adequate guidance and support of a reciprocable member for guidance along linear V's and flats, and It is another object of this invention to provide adjustment means for the air pads so that they are properly spacially related to the reciprocable member.

Oher objects and advantages of this invention will be found in the following specification and drawings in which FIGURE 1 is a side elevational view of a reciprocable machine tool member.

Figure 1:
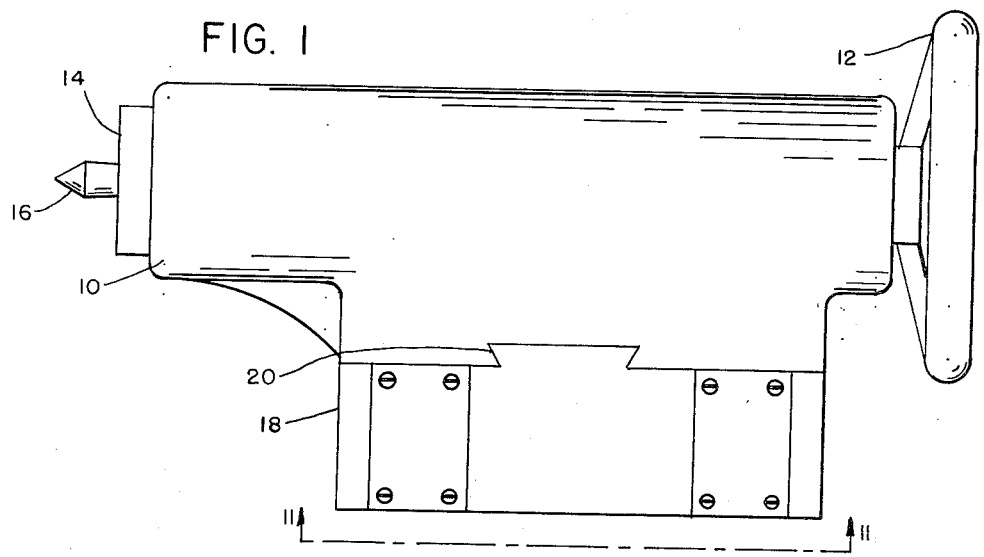

Referring now to FIGURE 1, a reciprocable machine tool element is shown at 10. In the specific embodiment, this reciprocable member is a tailstock for a lathe having a handwheel 12 which causes an extension and withdrawal of spindle 14 which carries a center 16. The upper part of the member 10 is mounted on a lower portion or base 18 by means of a dovetail 20. The base 18 reciprocates upon the V 22 and flat 24 of a bed 26. While a tailstock is described as a specific embodiment for application of the invention, it is clear that other reciprocable machine tool members can be properly guided and supported by means of the air bearings of my invention. Accordingly, while the specific embodiment is shown to be a tailstock, it will be clear from the following description that the machine structure above the base 18 has no direct relationship to the invention and therefore could be a tailstock, a lathe carriage, a bed turret, a planer table, a milling machine table, a grinding machine table or slides for various types of machine tools and other equipment or the like.

Figure 2:
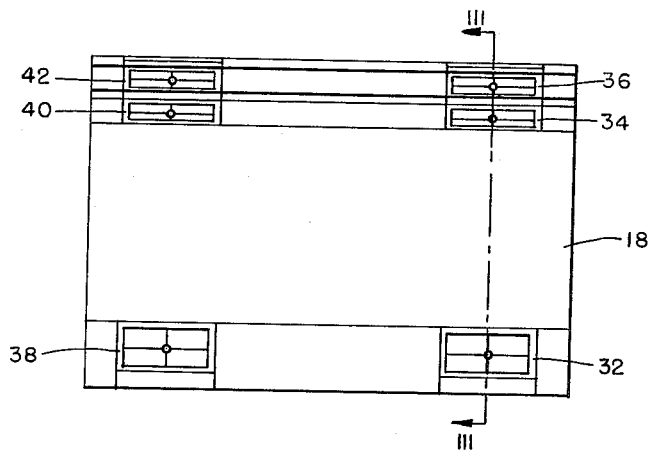
FIGURE 2 is a bottom view of this member viewed along the line II—II of FIGURE 1.
Figure 5:
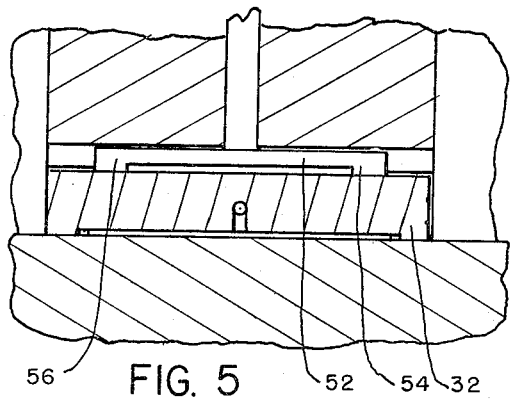
FIGURE 5 is a section along the line V—V of FIGURE 4 showing generally the manner in which the pad is mounted in the member.
Figure 3:
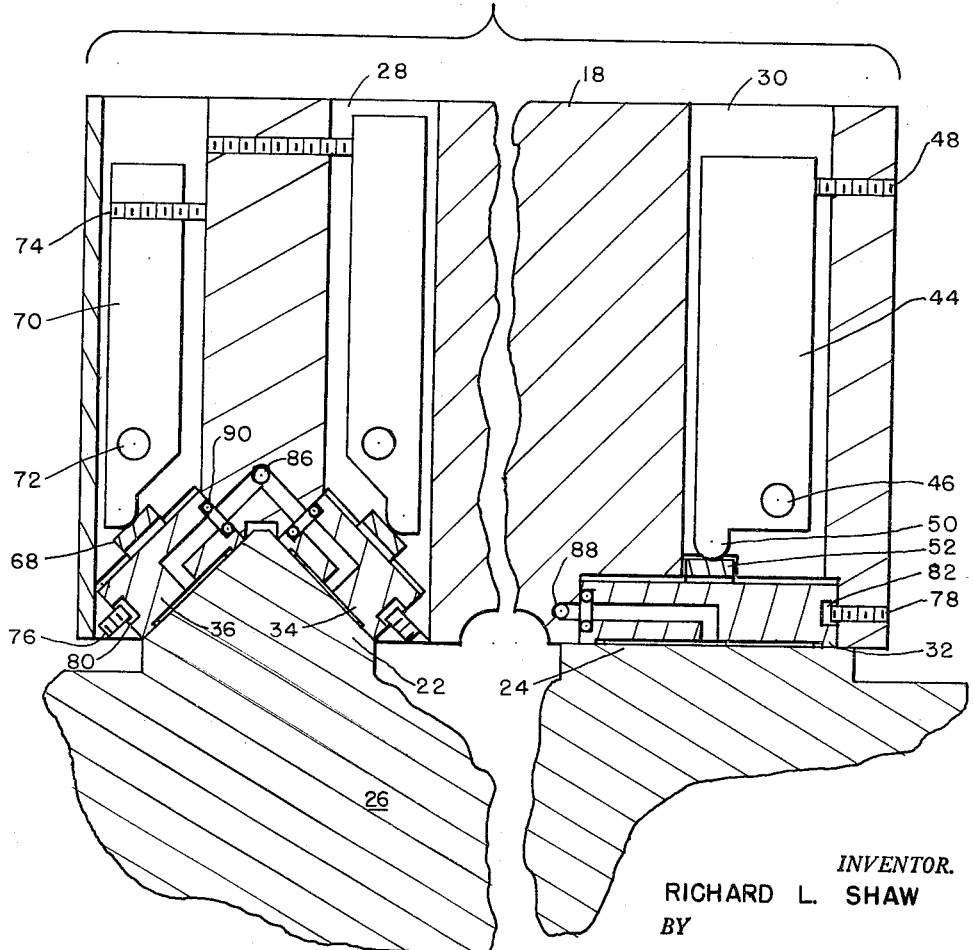
FIGURE 3 is a section through the member along the line III—III of FIGURE 2.

Referring now to FIGURE 3, the base 18 is slotted at 28 and 30 to receive the air pads and their adjusting structure. The air pad 32 is mounted on the flat 24 and the air pads 34 and 36 co-operate and mate with the V 22. These pads are at one end of the base 18 as shown in FIGURE 2 and associated with them at the other end and in similarly mounted positions are the air pads 38, 40 and 42. Specifically referring to the mounting of the air pad 32, as shown in FIGURE 3, in the slot 30 is mounted an adjusting lever 44 pivoted at 46 and adjusted by screw 48. The tongue 50 of the lever 44 engages with bridge type spring 52 which is more clearly shown in FIGURE 5. Moving this screw inwardly rocks the lever 44 in a counterclockwise direction to load the spring 52. The two feet 54 and 56 on the spring engage with the upper surface of the air pad 32 to urge it downwardly against the flat 24. This structure permits the air pad 32 to universally rock with respect to the base 18 to permit it to lie exactly parallel to the flat 24. Another type of spring could be used, but this type has an unusually high rate and is adaptable to mounting in a restricted space.

Figure 4:
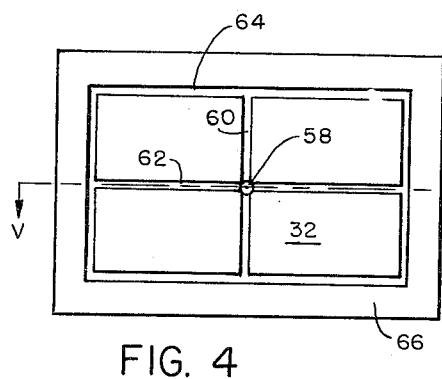
FIGURE 4 is the bottom view of one of the pads shown in FIGURES 2 and 3.

Referring now to FIGURE 4, the air lift pad is shown therein. It has been demonstrated that due to the extreme compressibility of air, as contrasted to liquids, it is very desirable to keep the air volume at a minimum. This invention contemplates a lifting pad which has absolutely minimum volume and thus keeps the resonant frequency as high as possible. To accomplish this result, the orifice supplying the pressure area of each pad is formed as a channel in the flat face of the pad. In the specific pad shown in FIGURE 4, the air supply conduit 58 enters at the center and connected to it at the face are cross orifice channels 60 and 62 at right angles to each other. These orifices channels feed boundary channel 64 which extends around the pad 32, closely adjacent the edge thereof. Boundary channel 64 is supplied with air through the aforementioned orifice channels 60 and 62 and accordingly, pressure is maintained over the face area of pad 32 within the confines of channel 64. The value of the pressure in channel 64 and within the area surrounded by channel 64 is primarily defined by the pressure drop due to flow through orifice channels 60 and 62. The pressure across land 66 between the boundary channel 64 and the edge of the pad 32 decreases in substantially linear fashion between the boundary channel 64 and the edge. It can be seen that when air under pressure is supplied to the inlet 58, flow through orifice channels 60 and 62 fills boundary channels 64. Pressure within the area confines of boundary channel 64 becomes equal to or slightly higher than the pressure in channel 64 and, presuming the loading is less than the lifting force due to pressure, the pad lifts away from the flat way surface 24. The lift would be in the order of .0001" or somewhat more and this lift would permit escape of air from channel 64 across land 66 until the pressure within the area bounded by channel 64 was decreased sufficiently to balance the load. An increase in load would cause a drop of the pad, less clearance, more pressure drop across land 66, and more pressure within channel 64 and within its confines which would cause the additional lifting force to again balance the load. Lifting in the order of .0001" is adequate when the surfaces from which the lifting takes place are straight and flat, such as is found in machine tools. The pad area and available air pressure should be adjusted to accomplish results in this neighborhood. For higher lifts, higher pressures, higher flows (larger orifices) and wider pressure drop lands such as 66 are suggested. These factors must be adjusted to accomplish the desired results.

It can be seen that the plurality of pads necessary to properly lift a machine well must be in exact relationship to each other. To accomplish this relationship, this invention contemplates adjustment of the pad relative to the base member 18 so that each lifting pad does its share of the work. If each pad is not lifting properly, one corner will become overloaded and drag thereby destroying the low friction advantage of the air lifting pads. The pads 34 and 36 have bridge type springs such as the spring 68 shown with respect to pad 36. Mounted to engage the spring 68 is a lever 70 pivoted at 72 and adjustable by means of a screw 74. This provides adjustment of the pad 36 relative to the base 18 and the pad 34 is adjusted in a substantially identical manner. Retaining screws 76 and 78 engage in recesses 80 and 82 to keep the pads 36 and 32 from falling out of the recesses provided for them. The other lifting pads are all provided with adjusting means and retaining screws such as the ones described.

Figure 6:
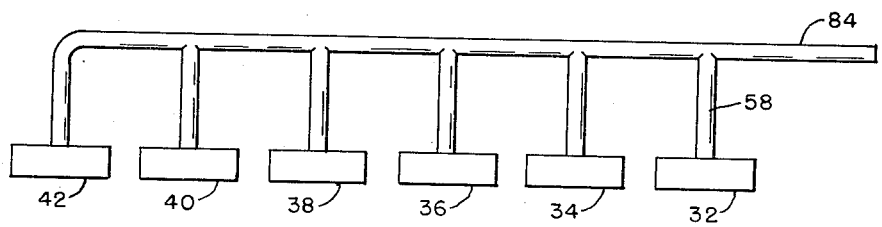
FIGURE 6 is a schematic showing of how the air pads in the member are connected.

Referring now to FIGURE 6, the schematic drawing shows an air supply 84 from a compressor or the like supplying the air pads 32, 34, 36, 38, 40 and 42 in parallel. No orifices or other restrictions are provided in the paralleled air pads before the orifice channels provided in each pad similarly to orifice channels 60 and 62 of pad 32, and these therefore become restricted orifice channels. Suitable innerdrilling 86 and 88 and tube and flexible hoses, where necessary, interconnect the pads in the actual structure of base 18. These innerdrillings are connected by O-ring seals such as 90 to the pads and thus, air is distributed to all of them.

Having described my invention in its preferred embodiment, it can be seen that it is susceptible to several modifications and adaptations without departing from the inventive concept. Accordingly, I request that the invention be defined by the scope of the following claims.

What I claim is:

1. In a machine, a substantially flat machine way bearing area, a bearing pad having a substantially flat total bearing area, the planes of said machine way bearing area and said bearing pad bearing area being substantially parallel and closely spaced, spring means acting between said machine and said bearing pad, and adjustable screw means acting on said spring means for adjustable stress therein, a gaseous fluid pressure supply to said pad bearing area, a restricted orifice channel in said pad bearing area to control gaseous fluid flow to said pad bearing area, and boundary channel means in said pad bearing area to define a substantially constant fluid pressure area smaller than the total bearing area of said pad whereby gaseous fluid under pressure is maintained between said bearing areas to keep said planes separated.

2. In a machine, guideways on the machine, a member having a base arranged to reciprocate on said guideways, a plurality of bearing pads having bearing faces in said base arranged in bearing relationship to said guideways, said plurality of bearing pads being sufficient in number and arranged in said base to properly support and guide said base with respect to said guideways, spring means acting between each of said bearing pads and said base, and means to adjust the tension on each of said spring means, said bearing pads each being connected to a source of gaseous fluid under pressure at a supply conduit, a boundary channel in each said face arranged near the periphery of said face and at least one orifice channel in the bearing face of each pad between said supply conduit and each said boundary channel whereby said fluid under pressure flows from said supply conduit through said orifice channel into said boundary channel to cause the area embraced by said boundary channel to become pressurized to lift each said pad away from said guideway to create a low friction bearing.

3. In a machine, guideways on the machine, a member having a base arranged to reciprocate on said guideways, a plurality of bearing pads in said base, said bearing pads being of sufficient number and arranged in such a manner as to properly guide and support said base in its reciprocations on said guideways, each of said bearing pads being individually adjustable with respect to said base, each said adjustment including screw adjusting means operating on a spring, said springs each engaging one of said bearing pads to urge it into engagement with said guideways, and means to introduce gaseous fluid under pressure between said bearing pads and said guideways to lift said pads from said guideways and provide low frictional resistance, said pads being adjustable relative to said base so that each pad carries its share of the load so that said pads are lifted substantially equidistant from said guideways.

4. In a machine, a substantially flat machine way bearing area, a bearing pad having a substantially flat total bearing area, the planes of said machine way bearing area and said bearing pad bearing area being substantially parallel and closely spaced, a gaseous fluid pressure supply to said pad bearing area, spring means acting between said machine and said bearing pad, and adjustable screw means acting on said spring means for adjustable stress therein, orifice channel means in said pad bearing area to control gaseous fluid flow, boundary channel means in said pad bearing area to define a substantially constant fluid pressure area smaller than the total bearing area of said pad said orifice channel means connecting said fluid pressure supply to said boundary channel means to control fluid flow thereto whereby gaseous fluid under pressure is maintained between said bearing areas to keep said planes separated with the amount of separation affecting the restriction of said orifice channel means.

5. In a machine, guideways on the machine, a member having a base arranged to reciprocate on said guideways, a plurality of bearing pads having bearing faces in said base arranged in bearing relationship to said guideways, said plurality of bearing pads being sufficient in number and arranged in said base to properly support and guide said base with respect to said guideways, said bearing pads each being connected to a source of gaseous fluid under pressure at a supply conduit, a boundary channel in each said face arranged near the periphery of said face and at least one orifice channel in the face of each said bearing pad between said supply conduit and each said boundary channel, spring means acting between each of said bearing pads and said base, and means to adjust the tension on each of said spring means so that each bearing pad may carry its share of support whereby said fluid under pressure flows from said supply conduit through said orifice channel into said boundary channel to cause the area embraced by said boundary channel to become pressurized to lift each said pad away from the respective guideway to create a low friction bearing.

6. In a machine, guideways on the machine, a member having a base arranged to reciprocate on said guideways, a plurality of bearing pads each having a bearing area in said base, said bearing pads being of sufficient number and arranged in such a manner as to properly guide and support said base in its reciprocations on said guideways, each of said bearing pads being individually adjustable with respect to said base, each said adjustment including screw adjusting means operating on spring means, said spring means engaging said bearing pads to urge same into engagement with said guideways, means to retain said pads in said base, introduce gaseous fluid under pressure between said bearing pads and said guideways to lift said pads from said guideways and, provide low frictional resistance, said pads being adjustable relative to said base so that each pad carries its share of the load so that said pads are lifted substantially equidistant from said guideways.

7. In a machine, guideways on the machine, a member having a base arranged to reciprocate on said guideways, a plurality of bearing pads each having a bearing area in said base, said bearing pads being of sufficient number and arranged in such a manner as to properly guide and support said base in its reciprocations on said guideways, each of said bearing pads being individually adjustable with respect to said base, each said adjustment including screw adjusting means operating on spring means, said spring means each engaging one of said bearing pads to urge it into engagement with said guideways, and a gaseous fluid pressure supply to said pad bearing area, orifice channel means to control gaseous fluid flow, boundary channel means in said pad bearing area to define a substantially constant fluid pressure area smaller than the total bearing area of said pad, said orifice channel means connecting said fluid pressure supply to said boundary channel means to control fluid flow thereto, said pads being adjustable relative to said base so that each pad carries its share of the load so that said pads are lifted substantially equidistant from said guideways.

References Cited in the file of this patent
UNITED STATES PATENTS

| | | |
|---|---|---|
| 2,062,250 | Moller | Nov. 24, 1936 |
| 2,511,979 | Goddard | June 20, 1950 |
| 2,660,484 | Gerald et al. | Nov. 24, 1953 |
| 2,710,234 | Hansen | June 7, 1955 |
| 2,942,385 | Pal | June 28, 1960 |